United States Patent
Ishizaka

(10) Patent No.: US 9,256,055 B2
(45) Date of Patent: Feb. 9, 2016

(54) IMAGING LENS

(71) Applicant: KANTATSU CO., LTD., Yaita-shi, Tochigi (JP)

(72) Inventor: Tohru Ishizaka, Sukagawa (JP)

(73) Assignee: KANTATSU CO., LTD., Tochigi (JP)

( * ) Notice: Subject to any disclaimer, the term of this patent is extended or adjusted under 35 U.S.C. 154(b) by 0 days.

(21) Appl. No.: 14/715,259

(22) Filed: May 18, 2015

(65) Prior Publication Data

US 2015/0247993 A1 Sep. 3, 2015

Related U.S. Application Data

(63) Continuation of application No. 14/132,695, filed on Dec. 18, 2013, now Pat. No. 9,063,318.

(30) Foreign Application Priority Data

Jan. 30, 2013 (JP) .................................. 2013-015291

(51) Int. Cl.
*G02B 9/64* (2006.01)
*G02B 3/02* (2006.01)
*G02B 13/00* (2006.01)
*G02B 27/00* (2006.01)

(52) U.S. Cl.
CPC .............. *G02B 13/0045* (2013.01); *G02B 9/64* (2013.01); *G02B 27/0025* (2013.01)

(58) Field of Classification Search
USPC .................................................. 359/708, 755
See application file for complete search history.

(56) References Cited

FOREIGN PATENT DOCUMENTS

JP     2007-264180 A    10/2007
JP     2011-085733 A     4/2011

*Primary Examiner* — Jack Dinh
(74) *Attorney, Agent, or Firm* — Westerman, Hattori, Daniels & Adrian, LLP

(57) ABSTRACT

A low-cost imaging lens which corrects aberrations properly with a small F-value, ensures high performance with a larger number of constituent lenses and has a more low-profile design than before. The constituent lenses are arranged in the following order from an object side to an image side: a first lens having a convex object-side surface near an optical axis; a positive second lens; a negative third lens having a convex object-side surface near the optical axis; a fourth lens having at least one aspheric surface; a fifth lens as a double-sided aspheric lens; a sixth lens as a double-sided aspheric lens; and a seventh lens as a double-sided aspheric lens having a concave image-side surface near the optical axis. These constituent lenses are not joined to each other.

18 Claims, 10 Drawing Sheets

IMAGING LENS

CROSS REFERENCE TO RELATED APPLICATION

This application is a continuation of U.S. application Ser. No. 14/132,695, filed on Dec. 18, 2013, the contents of which are incorporated herein by reference.

The present application is based on and claims priority of Japanese patent application No. 2013-015291 filed on Jan. 30, 2013, the entire contents of which are hereby incorporated by reference.

BACKGROUND OF THE INVENTION

1. Field of the Invention

The present invention relates to imaging lenses which form an image of an object on a solid-state image sensor such as a CCD sensor or C-MOS sensor used in a compact image pickup device and more particularly to imaging lenses which are built in image pickup devices mounted in increasingly sophisticated mobile terminals such as smart phones, mobile phones, and PDAs (Personal Digital Assistants), and game consoles and information terminals such as PCs.

2. Description of the Related Art

In recent years, the market of tablet multifunctional terminals as typified by smart phones has been rapidly expanding and there is a general trend that such terminals incorporate high-performance, high-quality cameras which cope with an increase in the number of pixels, for example, over 8 megapixels. Since the trend towards cameras which cope with an increase in the number of pixels is expected to be accelerated, the imaging lenses built in image pickup devices are required to provide high performance to cope with an increase in the number of pixels and also be compact enough to suit low-profile product designs. Furthermore, since pixel size becomes smaller with the tendency toward smaller image sensors and a larger number of pixels, the imaging lenses are strongly expected to provide high brightness.

In addition to many types of imaging lens composed of four lenses (four-element imaging lens) which have been proposed so far, imaging lenses composed of five or six lenses (five-element or six-element imaging lens) are proposed in order to meet the trend toward higher performance and more compactness.

For example, JP-A-2007-264180 (Patent Document 1) discloses an imaging lens which includes, in order from an object side, a positive first lens having a convex object-side surface, a negative meniscus second lens having a concave image-side surface, a positive meniscus third lens having a convex image-side surface, a negative fourth lens as a double-sided aspheric lens having a concave image-side surface near an optical axis, and a positive or negative fifth lens as a double-sided aspheric lens.

Also, JP-A-2011-085733 (Patent Document 2) discloses an imaging lens system which includes, in order from an object side, a first lens group including a first lens with a convex object-side surface, a second lens group including a second lens with a concave image-side surface, a third lens group including a meniscus third lens with a concave object-side surface, a fourth lens group including a meniscus fourth lens with a concave object-side surface, and a fifth lens group including a meniscus fifth lens with an aspheric object-side surface having an inflection point, and also discloses an imaging lens composed of six lenses including a positive lens having a slightly convex surface on the object side of the above lens system and a slightly concave surface on its image side.

The imaging lens described in Patent Document 1, composed of five lenses, realizes a high-performance imaging lens system which corrects axial chromatic aberrations and chromatic aberrations of magnification and copes with an increase in the number of pixels, by optimizing the lens material and lens surface shapes. However, its total track length is as long as about 8 mm and there is difficulty in applying it to an increasingly low-profile image pickup device. Also, the F-value is about 2.8, which is not sufficient to provide high brightness as expected in recent years.

Patent Document 2 discloses a high-resolution imaging lens composed of five lenses and a high-resolution imaging lens composed of six lenses. The total track length of the five-element imaging lens is about 6 mm and that of the six-element imaging lens is about 6.6 mm, so these imaging lenses are considered to meet the demand for a low-profile design to some extent. However, in this technique, the F-value is about 2.8, so it is difficult to provide both high resolution and high brightness as expected in recent years.

SUMMARY OF THE INVENTION

The present invention has been made in view of the above problem and an object thereof is to realize a high-performance lens system which corrects various aberrations properly with a small F-value and provide a low-cost imaging lens which can be more low-profile or thinner than before even though a larger number of constituent lenses are used.

According to an aspect of the present invention, there is provided a fixed-focus imaging lens composed of seven lenses to form an image of an object on a solid-state image sensor, in which the lenses are arranged in the following order from an object side to an image side: a first lens having a convex surface on the object side near an optical axis; a second lens with positive refractive power; a third lens with negative refractive power having a convex surface on the object side near the optical axis; a fourth lens having at least one aspheric surface; a fifth lens as a double-sided aspheric lens; a sixth lens as a double-sided aspheric lens; and a seventh lens as a double-sided aspheric lens having a concave surface on the image side near the optical axis. The constituent lenses are not joined to each other.

According to another aspect of the present invention, there is provided a fixed-focus imaging lens composed of seven lenses to form an image of an object on a solid-state image sensor, in which the lenses are arranged in the following order from an object side to an image side: a first lens as a double-sided aspheric lens having a convex surface on the object side near an optical axis; a second lens with positive refractive power having a convex surface on the object side near the optical axis; a third lens as a double-sided aspheric lens; a fourth lens as a double-sided aspheric lens; a fifth lens as a double-sided aspheric lens; a sixth lens as a double-sided aspheric lens having a meniscus shape with a convex surface on the object side near the optical axis; and a seventh lens as a double-sided aspheric lens with negative refractive power having a concave surface on the image side near the optical axis. The constituent lenses are not joined to each other.

The above imaging lens uses a larger number of constituent lenses than the many imaging lenses proposed so far. Obviously an imaging lens which uses a larger number of constituent lenses provides higher performance, but it is disadvantageous in achieving thinness and cost reduction. The present invention is intended to meet the need for an imaging lens with a small F-value which provides high performance suitable for an image sensor handling an increasing number of pixels and which is thinner or more low-profile than before.

In the above imaging lens, the positive refractive power of the second lens is stronger than that of the first lens so that spherical aberrations, astigmatism, and axial chromatic aberrations are corrected, and the second lens has a relatively strong positive refractive power so that the total track length is shortened. When both the surfaces of each of the first lens and the second lens have adequate aspheric shapes, various aberrations are corrected properly.

The third lens, which has relatively strong negative refractive power, properly corrects residual axial chromatic aberrations which have not been corrected by the first lens and the second lens.

The fourth lens, which plays a major role in correction of aberrations, corrects spherical aberrations, astigmatism, and coma aberrations through at least one aspheric surface thereof and also contributes largely to reducing astigmatic difference. Since the fourth lens is intended to correct aberrations, it is desirable that its refractive power be weak. More specifically, it is preferable that its focal length be approximately 1.5 to 2 times longer than the focal length of the overall optical system of the imaging lens. In addition, when both the surfaces are aspheric, aberrations are corrected more properly.

The fifth lens is a meniscus lens which has the weakest positive or negative refractive power in the lens system and has a concave surface on the object side. It is responsible for further correction of axial chromatic aberrations, proper correction of chromatic aberrations of magnification. It also corrects distortion on the image plane in the area from a low image height point to a nearly 80% image height point.

Both the surfaces of each of the sixth lens and the seventh lens have adequate aspheric shapes to control the angle of light rays emitted from the fifth lens in the area from the low image height point to the maximum image height point properly to form an image on the image plane. At the same time, these lenses are responsible for final correction of spherical aberrations in the lens peripheral portion, astigmatism, astigmatic difference, and distortion.

Generally, when the F-value is smaller, the entrance pupil diameter and the lens effective diameter are larger and the diameter of the flux of light entering the lens system is larger. This leads to an increase in the amount of spherical aberrations in the lens peripheral portion and an increase in the amount of off-axial aberrations. Therefore, when the F-value is smaller, means to correct various aberrations must be increased. In the present invention, the seven constituent lenses are each designed to have optimum refractive power and adequate aspheric surfaces are formed on specific lens surfaces so as to correct aberrations more effectively. Consequently the lens system in the present invention achieves a small F-value, for example, about 1.6, which the existing five-element or six-element imaging lenses could not achieve, and also corrects aberrations properly.

In the present invention, no cemented lenses are used and the constituent lenses are spaced from each other so that the number of aspheric surfaces can be increased to enhance performance. Also, plastic material is used as much as possible to reduce cost.

In the present invention, preferably the first lens has a meniscus shape with a convex surface on the object side near the optical axis and both the surfaces have aspheric shapes with the peripheral portions curved toward the object side. Since the first lens, located nearest to the object side, has such aspheric shapes, the amount of spherical aberrations which occur on the peripheral portion of the biconvex second lens with strong refractive power can be decreased by the aspheric shapes of the first lens and field curvature in the area from a nearly middle image height point to the maximum image height point can be corrected easily.

Preferably the imaging lens according to the present invention satisfies conditional expressions (1), (2), and (3) below:

$$50 < vd1 < 60 \quad (1)$$

$$50 < vd2 < 60 \quad (2)$$

$$20 < vd3 < 30 \quad (3)$$

where
vd1: Abbe number of the first lens at d-ray,
vd2: Abbe number of the second lens at d-ray, and
vd3: Abbe number of the third lens at d-ray.

The conditional expression (1) defines an adequate range for the Abbe number of the first lens, the conditional expression (2) defines an adequate range for the Abbe number of the second lens, and the conditional expression (3) defines an adequate range for the Abbe number of the third lens. When the positive first and second lenses fall within the ranges defined by the conditional expressions (1) and (2) respectively and a low-dispersion material is used for them, chromatic aberrations are suppressed; and when the third lens falls within the range defined by the conditional expression (3), the third lens corrects residual axial aberrations which have not been corrected by the first lens and the second lens, without increasing the negative refractive power of the third lens more than necessary. If the value is below the lower limit of the conditional expression (1) or conditional expression (2), correction of axial chromatic aberrations might be insufficient and if it is above the upper limit, it would be difficult to use an inexpensive material. If the value is below the lower limit of the conditional expression (3), it would be difficult to use an inexpensive material and if it is above the upper limit, axial chromatic aberrations cannot be corrected sufficiently.

Preferably the imaging lens according to the present invention satisfies conditional expressions (4) and (5) below:

$$50 < vd4 < 60 \quad (4)$$

$$20 < vd5 < 30 \quad (5)$$

where
vd4: Abbe number of the fourth lens at d-ray, and
vd5: Abbe number of the fifth lens at d-ray.

The conditional expression (4) defines an adequate range for the Abbe number of the fourth lens and the conditional expression (5) defines an adequate range for the Abbe number of the fifth lens. When the fourth lens falls within the range defined by the conditional expression (4) and a low-dispersion material is used, chromatic aberrations of magnification are suppressed, and when the fifth lens falls within the range defined by the conditional expression (5), chromatic aberrations of magnification are corrected effectively. If the value is below the lower limit of the conditional expression (4) and the value is above the upper limit of the conditional expression (5), chromatic aberrations of magnification would not be corrected sufficiently. If the value is above the upper limit of the conditional expression (4) and the value is below the lower limit of the conditional expression (5), it would be difficult to use an inexpensive material.

In the present invention, preferably the fourth lens has a biconvex shape near the optical axis and its image-side surface has an aspheric shape with a concave surface in the peripheral portion. This aspheric shape moderately weakens the positive refractive power in the peripheral portion of the fourth lens and makes it possible to control the angle of off-axial incident light rays properly. The aspheric shape is effective not only in correcting various aberrations but also in preventing a drop in the ratio of the brightness in the peripheral area of the image plane to that in its center area, namely relative illumination.

In the present invention, preferably the sixth lens has a meniscus shape with a convex surface on the object side near the optical axis and its aspheric object-side and image-side surfaces each have a pole-change point in a position off the optical axis. The existence of the pole-change point in a position off the optical axis, namely in the lens peripheral portion, means that both the surfaces in the peripheral portion of the lens are curved toward the object side. Due to the aspheric shapes, the refractive power continuously changes in the area from the center of the lens to its peripheral portion so that spherical aberrations and field curvature are corrected, particularly in the peripheral portion.

In the present invention, preferably the seventh lens has negative refractive power and the aspheric image-side surface thereof has a pole-change point in a position off the optical axis. Due to the existence of the pole-change point, the image-side surface in the peripheral portion has a convex shape, so the negative refractive power of the seventh lens weakens in the peripheral portion or changes to positive refractive power in the peripheral portion. This aspheric surface makes it easy to control the angle of a chief ray incident on the image sensor at each image height point. When the object-side surface of the seventh lens is an aspheric surface with positive refractive power in the peripheral portion, it brings about the same effect.

In the present invention, a "pole-change point" here means a point on an aspheric surface at which a tangential plane intersects the optical axis perpendicularly.

Preferably the imaging lens according to the present invention satisfies conditional expressions (6) and (7) below:

$$0.55 < f12/f < 0.88 \quad (6)$$

$$-1.2 < f3/f < -0.7 \quad (7)$$

where f: focal length of the overall optical system of the imaging lens, f12: composite focal length of the first lens and the second lens, and f3: focal length of the third lens.

The conditional expression (6) defines an adequate range for the composite focal length of the first lens and the second lens with respect to the focal length of the overall optical system of the imaging lens. If the value is below the lower limit of the conditional expression (6), the composite positive refractive power of the first lens and the second lens would be too strong, making it difficult to correct spherical aberrations, coma aberrations, and astigmatism, and if it is above the upper limit, the composite positive refractive power of the first lens and the second lens would be too weak, making it difficult to shorten the total track length.

The conditional expression (7) defines an adequate range for the focal length of the third lens with respect to the focal length of the overall optical system of the imaging lens. If the value is below the lower limit of the conditional expression (7), the negative refractive power of the third lens would be too weak, making it difficult to correct axial chromatic aberrations, and if it is above the upper limit, the negative refractive power of the third lens would be too strong, making it difficult to shorten the total track length.

A more preferable range of the conditional expression (6) is a conditional expression (6a) below:

$$0.60 < f12/f < 0.80. \quad (6a)$$

A more preferable range of the conditional expression (7) is a conditional expression (7a) below:

$$-1.05 < f3/f < -0.70. \quad (7a)$$

DETAILED DESCRIPTION OF THE PREFERRED EMBODIMENTS

Next, the preferred embodiments of the present invention will be described in detail referring to the accompanying drawings. FIGS. 1, 3, 5, 7, and 9 are schematic views showing the general configurations of the imaging lenses according to Examples 1 to 5 of an embodiment of the present invention respectively. Since all these examples have the same basic configuration, a detailed explanation of an imaging lens according to the present embodiment is given below referring to the schematic view of Example 1.

Figure 1:
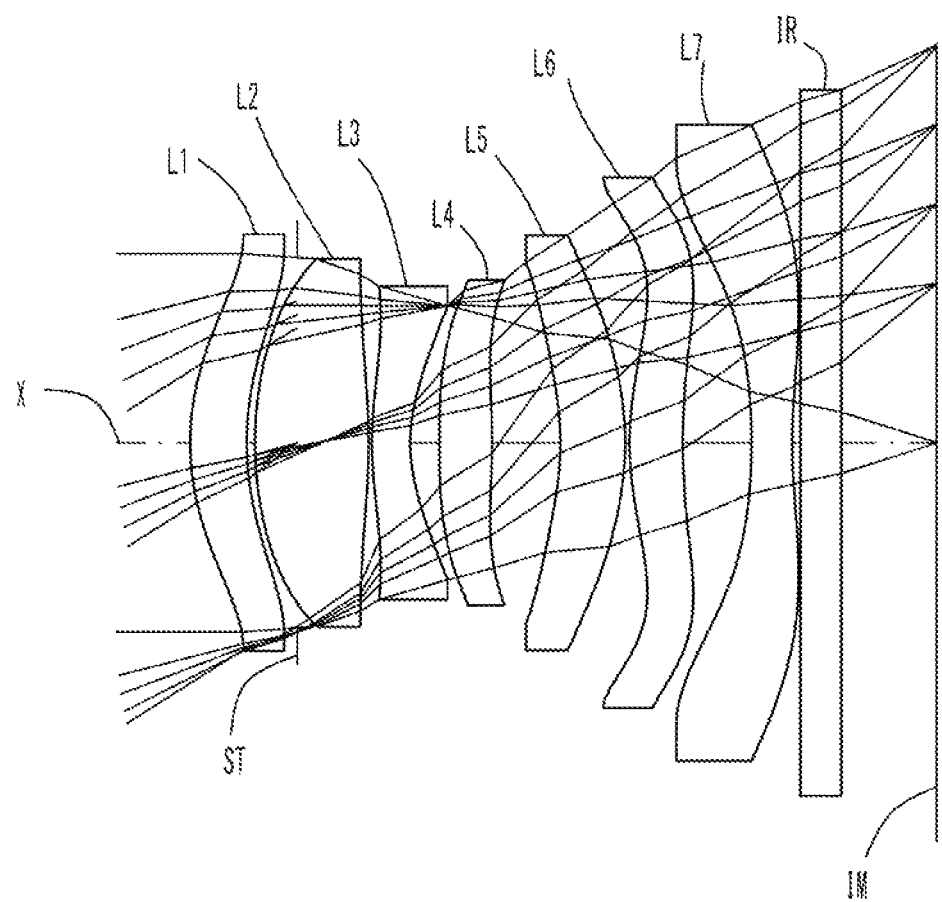
FIG. 1 is a schematic view showing the general configuration of an imaging lens according to Example 1 of the invention.

As shown in FIG. 1, in the imaging lens according to Example 1, lenses are arranged in the following order from an object side to an image side: a first lens L1 with positive refractive power having a convex surface on the object side near an optical axis X, a second lens L2 with positive refractive power having convex surfaces on the object side and the image side near the optical axis X, a third lens L3 with negative refractive power having a concave surface on the image side near the optical axis X, a fourth lens L4 having at least one aspheric surface, a meniscus fifth lens L5 having a concave surface on the object side near the optical axis X, a sixth lens L6 as a double-sided aspheric lens, and a seventh lens L7 as a double-sided aspheric lens with negative refractive power having a concave surface on the image side near the optical axis X. An aperture stop ST is located between the object-side surface apex of the second lens L2 and the peripheral edge of the same surface. Also a filter IR such as an infrared cut filter is located between the seventh lens L7 and an image plane IM. In this embodiment, all lenses are made of plastic material and the first lens L1, the second lens L2, the fourth lens L4, the sixth lens L6, and the seventh lens L7 are made of a low-dispersion cycloolefin material and the third lens L3 and the fifth lens L5 are made of a high-dispersion polycarbonate material.

In the above imaging lens, the positive refractive power of the second lens L2 is stronger than that of the first lens L1 so that spherical aberrations, astigmatism, and axial chromatic aberrations are corrected, and the positive refractive power of the second lens L2 is the strongest in the imaging lens so that the total track length is shortened. Both the surfaces of each of the first lens L1 and the second lens L2 have aspheric shapes to correct various aberrations properly. The first lens L1 is a meniscus lens which has a convex surface on the object side near the optical axis X and has peripheral portions curved toward the object side on both the aspheric surfaces. The amount of spherical aberrations which occur on the peripheral portion of the biconvex second lens L2 with strong refractive power is decreased by the aspheric shapes of the first lens L1. Also, field curvature is corrected in the area from a nearly middle image height point to the maximum image height point.

The third lens L3 properly corrects residual axial chromatic aberrations which have not been corrected by the first lens L1 and the second lens L2. The third lens L3 is a meniscus lens having a concave surface on the image side, in which both the surfaces are aspheric. The aspheric object-side surface of the lens changes to a concave shape in the peripheral portion, thereby preventing a drop in the quantity of light arriving at the peripheral area of the image plane IM.

The fourth lens L4 corrects spherical aberrations, astigmatism, and coma aberrations through at least one aspheric surface formed thereon and also plays an important role in reducing astigmatic difference. In this embodiment, both the surfaces of the fourth lens L4 have aspheric shapes to correct various aberrations properly. The fourth lens L4 has a biconvex shape near the optical axis X and its image-side surface has an aspheric shape with a concave surface in the peripheral portion. The aspheric shape of the image-side surface weakens the positive refractive power in the peripheral portion in order to control the angle of off-axial incident light rays properly. This aspheric shape not only corrects various aberrations but also prevents a drop in the ratio of the brightness in the peripheral area of the image plane IM to that in its center area, namely relative illumination.

The fifth lens L5 is a meniscus lens which has the weakest positive or negative refractive power in the imaging lens and it has a concave surface on the object side. It is responsible for further correction of axial chromatic aberrations, proper correction of chromatic aberrations of magnification and also correction of distortion on the image plane IM in the area from a low image height point to a nearly 80% image height point.

The sixth lens L6 has aspheric shapes on both the surfaces and mainly corrects spherical aberrations in the lens peripheral portion and astigmatism, particularly sagittal image surface curvature. It also adequately controls the angle of light rays emitted from the fifth lens L5 in the area from the low image height point to the maximum image height point. The sixth lens L6 has a meniscus shape with a convex surface on the object side near the optical axis X, in which the aspheric surfaces on the object side and the image side each have a pole-change point in a position off the optical axis X. In other words, the peripheral portion of the lens is curved toward the object side on both the surfaces. Therefore, the refractive power continuously changes in the area from the center of the lens to its peripheral portion so that spherical aberrations and field curvature are corrected, particularly in the lens peripheral portion.

The seventh lens L7 is a double-sided aspheric lens with negative refractive power having a concave surface on the image side near the optical axis X, making it easy to ensure an adequate back focus, correct astigmatism and control the chief ray angle (CRA) incident on the image sensor. The seventh lens L7 has a biconcave shape near the optical axis X and its aspheric image-side surface has a pole-change point in a position off the optical axis X. In other words, the image-side surface of the seventh lens L7 is an aspheric surface which is concave near the optical axis X and gradually changes to a convex shape in the direction toward the peripheral portion. Therefore, the negative refractive power of the seventh lens L7 decreases in the direction toward the peripheral portion or changes to positive refractive power in the peripheral portion. This aspheric surface controls the angle of a chief ray incident on the image sensor at each image height point. In this embodiment, the aspheric object-side surface of the seventh lens L7 is also an aspheric surface in which the refractive power changes to positive refractive power in the peripheral portion. In other words, the required positive refractive power in the peripheral portion of the seventh lens L7 is distributed to both the surfaces, so the aspheric surfaces do not need to have a sharp change in shape. If an aspheric surface has a sharp change in shape, it may be difficult to make an antireflection coating on it with uniform thickness. Especially, if the peripheral portion of the image-side surface of the seventh lens L7, located nearest to the image plane IM, has a shape sharply curved toward the object side, the antireflection coating on the curved portion would be thin and generation of unwanted light rays reflected by the inner surface of the curved portion would be likely to occur. If such unwanted light rays are again reflected by the inner object-side surface of the seventh lens L7, they might enter the image plane IM, causing a ghost phenomenon.

The imaging lens according to the present invention satisfies the following conditional expressions (1) to (7):

$$50 < vd1 < 60 \tag{1}$$

$$50 < vd2 < 60 \tag{2}$$

$$20 < vd3 < 30 \tag{3}$$

$$50 < vd4 < 60 \tag{4}$$

$$20 < vd5 < 30 \tag{5}$$

$$0.55 < f12/f < 0.88 \tag{6}$$

$$-1.2 < f3/f < -0.7 \tag{7}$$

where
vd1: Abbe number of the first lens L1 at d-ray,
vd2: Abbe number of the second lens L2 at d-ray,
vd3: Abbe number of the third lens L3 at d-ray,
vd4: Abbe number of the fourth lens L4 at d-ray,
vd5: Abbe number of the fifth lens L5 at d-ray,
f: focal length of the overall optical system of the imaging lens, f12: composite focal length of the first lens L1 and the second lens L2, and f3: focal length of the third lens L3.

The conditional expressions (1) to (5) define adequate ranges for the Abbe numbers of the first lens L1 to the fifth lens L5 respectively to ensure that axial chromatic aberrations and chromatic aberrations of magnification are corrected properly. When these conditional expressions are satisfied, readily available plastic materials can be used to reduce cost.

In addition, when the composite focal length of the first lens L1 and the second lens L2 and the focal length of the third lens L3 with respect to the focal length of the overall optical system of the imaging lens fall within the adequate ranges defined by the conditional expressions (6) and (7) respectively, the total track length is shortened and various aberrations are corrected.

In this embodiment, all the lens surfaces are aspheric. The aspheric shapes of these lens surfaces are expressed by the following equation, where Z represents an axis in the optical axis direction, H represents a height perpendicular to the optical axis, k represents a conic constant, and A4, A6, A8, A10, A12, A14, and A16 represent aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

Next, the imaging lenses according to examples of the present embodiment will be explained. In the description of each example, f represents the focal length of the overall optical system of the imaging lens, Fno represents an F-number, ω represents a half field of view, ih represents a maximum image height, TTL represents a total track length without a filter IR, etc. i represents a surface number counted from the object side, r represents a curvature radius, d represents the distance between lens surfaces on the optical axis X (surface distance), Nd represents a refractive index at d-ray (reference wavelength), and νd represents an Abbe number at d-ray. As for aspheric surfaces, an asterisk (*) after surface number i indicates that the surface concerned is an aspheric surface.

Example 1

1. The basic lens data of Example 1 is shown below in Table 1.

TABLE 1

Numerical Example 1
in mm f = 4.54
Fno = 1.64
ω (deg) = 32.3
ih = 2.93
TTL = 5.39

Surface Data

| Surface No. i | Curvature Radius r | Surface Distance d | Refractive Index Nd | Abbe Number νd |
|---|---|---|---|---|
| (Object Surface) | Infinity | Infinity | | |
| 1* | 1.902 | 0.415 | 1.5346 | 56.160 |
| 2* | 2.154 | 0.372 | | |
| 3 (Stop) | Infinity | −0.310 | | |
| 4* | 2.804 | 0.835 | 1.5346 | 56.160 |
| 5* | −4.629 | 0.025 | | |
| 6* | 2.635 | 0.281 | 1.6355 | 23.911 |
| 7* | 1.229 | 0.215 | | |
| 8* | 10.737 | 0.390 | 1.5346 | 56.160 |
| 9* | −6.667 | 0.504 | | |
| 10* | −2.053 | 0.475 | 1.6355 | 23.911 |
| 11* | −2.334 | 0.033 | | |
| 12* | 2.335 | 0.392 | 1.5438 | 55.570 |
| 13* | 5.444 | 0.504 | | |
| 14* | −4.682 | 0.300 | 1.5438 | 55.570 |
| 15* | 4.277 | 0.060 | | |
| 16 | Infinity | 0.300 | 1.5168 | 64.198 |
| 17 | Infinity | 0.711 | | |
| Image Plane | Infinity | | | |

Constituent Lens Data

| Lens | Start Surface | Focal Length |
|---|---|---|
| 1 | 1 | 19.339 |
| 2 | 4 | 3.399 |
| 3 | 6 | −3.930 |
| 4 | 8 | 7.754 |
| 5 | 10 | −78.686 |
| 6 | 12 | 7.201 |
| 7 | 14 | −4.062 |

TABLE 1-continued

Numerical Example 1
in mm

Composite Focal Length f12    3.132

Aspheric Surface Data

|     | 1st Surface | 2nd Surface | 4th Surface | 5th Surface | 6th Surface |
|-----|-------------|-------------|-------------|-------------|-------------|
| k   | 0.000E+00   | 0.000E+00   | 0.000E+00   | 0.000E+00   | −2.244E+01  |
| A4  | −2.585E−02  | −3.053E−02  | 1.738E−02   | 8.350E−02   | −7.495E−02  |
| A6  | −1.346E−02  | −1.724E−02  | −2.979E−03  | −3.576E−02  | 4.811E−03   |
| A8  | 3.021E−03   | −1.056E−03  | 6.816E−03   | 3.944E−03   | 7.677E−03   |
| A10 | −7.914E−03  | 3.264E−04   | −2.504E−04  | 5.485E−03   | −4.413E−04  |
| A12 | 3.743E−03   | 2.720E−04   | −3.703E−04  | −2.325E−03  | −5.191E−04  |
| A14 | −5.404E−04  | 7.458E−05   | 4.421E−05   | 1.804E−04   | −5.450E−09  |
| A16 | −8.605E−06  | −5.306E−05  | 2.125E−05   | 7.832E−10   | −2.786E−10  |

|     | 7th Surface | 8th Surface | 9th Surface | 10th Surface | 11th Surface |
|-----|-------------|-------------|-------------|--------------|--------------|
| k   | −5.106E+00  | 0.000E+00   | 0.000E+00   | 0.000E+00    | −1.360E+00   |
| A4  | 2.786E−03   | 1.333E−01   | 1.166E−01   | 1.826E−01    | 2.895E−02    |
| A6  | −2.679E−02  | −2.718E−02  | 8.934E−03   | −1.172E−01   | −1.823E−02   |
| A8  | 2.158E−02   | −2.275E−02  | −2.356E−02  | 4.533E−02    | 1.721E−04    |
| A10 | 2.014E−03   | 4.214E−03   | 6.432E−03   | −5.340E−03   | 3.419E−03    |
| A12 | −8.549E−03  | 7.364E−03   | 8.451E−05   | −1.253E−03   | −3.690E−04   |
| A14 | 4.813E−03   | −3.030E−03  | −3.635E−04  | 2.332E−10    | 1.495E−05    |
| A16 | −3.777E−12  | 0.000E+00   | 0.000E+00   | 9.965E−12    | −7.930E−05   |

|     | 12th Surface | 13th Surface | 14th Surface | 15th Surface |
|-----|--------------|--------------|--------------|--------------|
| k   | −1.057E+01   | 0.000E+00    | 2.518E+00    | −3.354E+01   |
| A4  | −6.430E−03   | 1.460E−02    | −4.876E−02   | −4.782E−02   |
| A6  | −3.412E−02   | −4.644E−02   | 1.146E−02    | 8.143E−03    |
| A8  | 6.072E−03    | 1.435E−02    | 7.163E−04    | −6.599E−04   |
| A10 | 2.003E−04    | −2.257E−03   | −7.095E−05   | 2.774E−05    |
| A12 | −3.274E−05   | 1.691E−04    | −2.653E−05   | −1.581E−06   |
| A14 | −5.291E−06   | 1.634E−06    | 2.233E−07    | −9.307E−07   |
| A16 | 1.691E−06    | 5.860E−07    | 4.051E−07    | 1.710E−07    |

As shown in Table 6, the imaging lens according to Example 1 satisfies all the conditional expressions (1) to (7).

Figure 2:
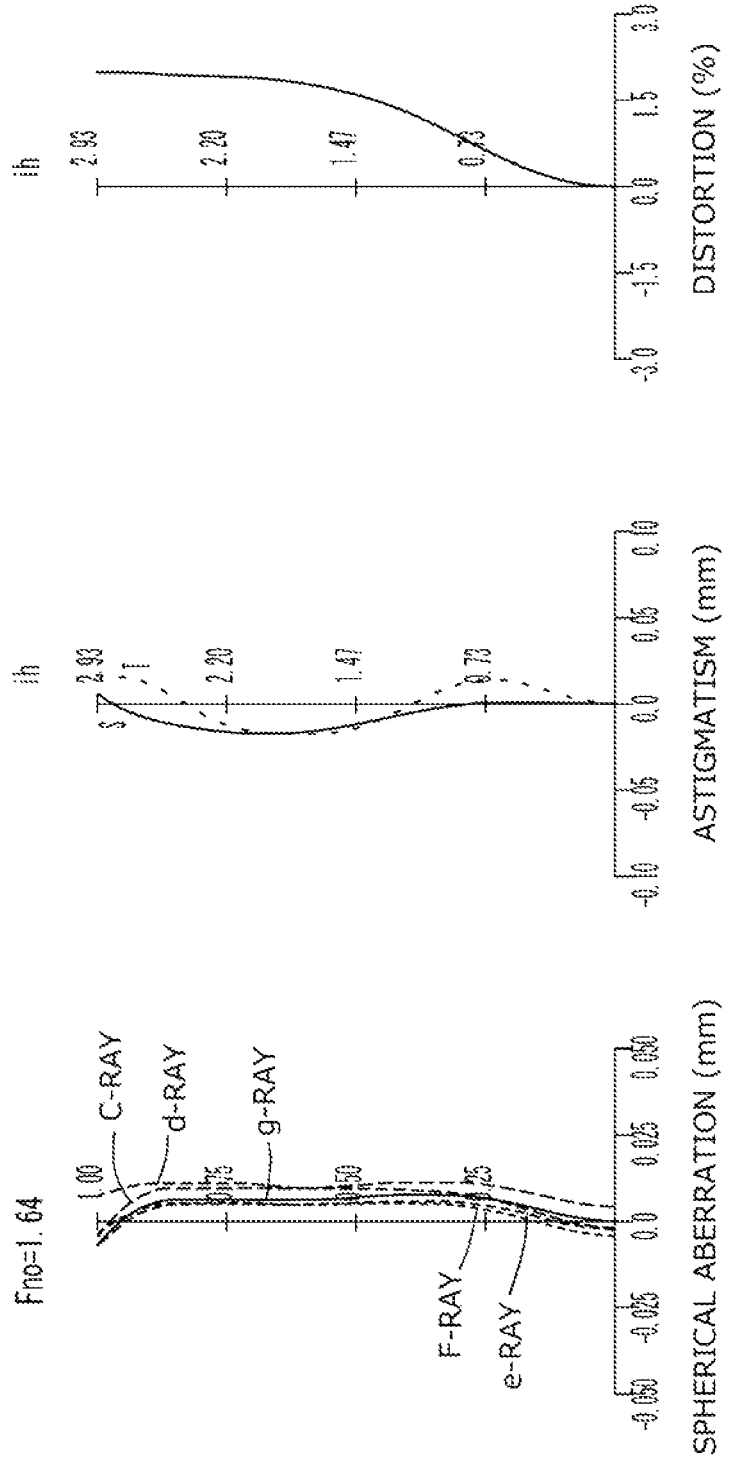
FIG. 2 shows spherical aberration, astigmatism, and distortion of the imaging lens according to Example 1.
Figure 3:
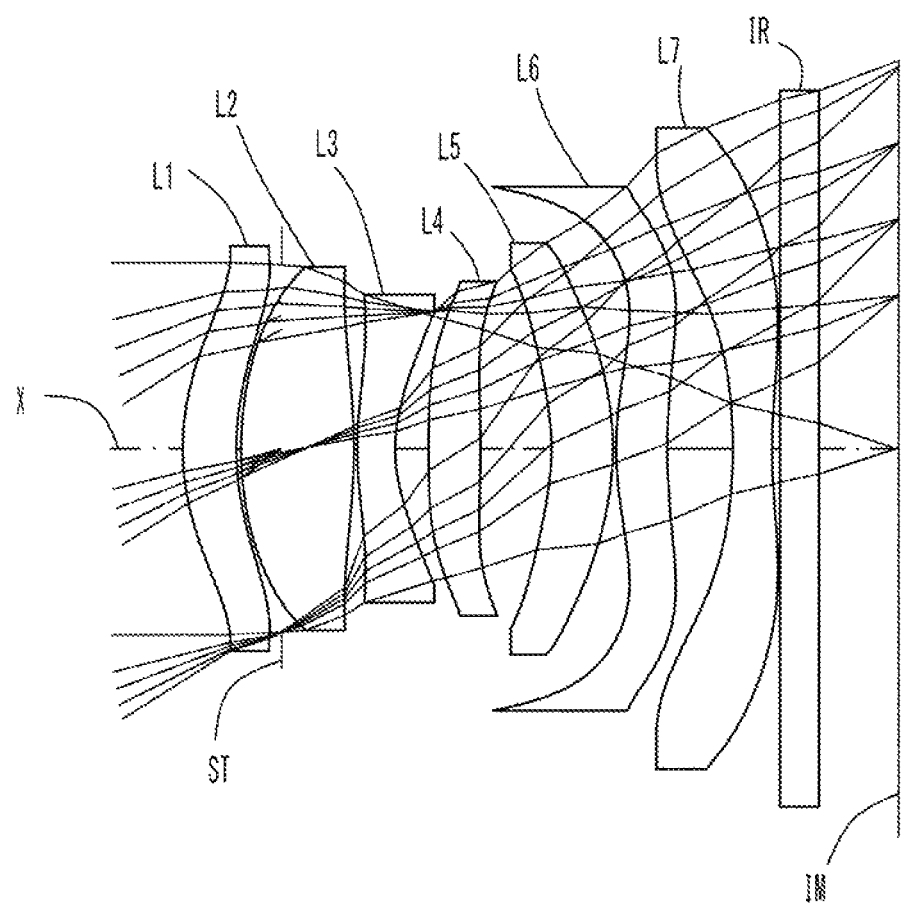
FIG. 3 is a schematic view showing the general configuration of an imaging lens according to Example 2 of the invention.

FIG. 2 shows spherical aberration (mm), astigmatism (mm), and distortion (%) of the imaging lens according to Example 1. The spherical aberration graph shows the amount of aberration at wavelengths of g-ray (436 nm), F-ray (486 nm), e-ray (546 nm), d-ray (588 nm), and C-ray (656 nm). The astigmatism graph shows the amount of aberration on sagittal image surface S and the amount of aberration on tangential image surface T (the same is true for FIGS. 4, 6, 8, and 10 which correspond to Examples 2 to 5 respectively). As FIG. 2 suggests, various aberrations are properly corrected.

Example 2

The basic lens data of Example 2 is shown below in Table 2.

TABLE 2

Numerical Example 2
in mm f = 4.57
Fno = 1.61
ω (deg) = 32.3
ih = 2.93
TTL = 5.38

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 1.953 | 0.411 | 1.5346 | 56.160 |
| 2* | 2.225 | 0.346 | | |

TABLE 2-continued

Numerical Example 2
in mm

| | | | | |
|---|---|---|---|---|
| 3 (Stop) | Infinity | −0.310 | | |
| 4* | 2.745 | 0.864 | 1.5346 | 56.160 |
| 5* | −4.089 | 0.025 | | |
| 6* | 2.662 | 0.290 | 1.6355 | 23.911 |
| 7* | 1.191 | 0.257 | | |
| 8* | 10.737 | 0.404 | 1.5346 | 56.160 |
| 9* | −6.667 | 0.541 | | |
| 10* | −2.006 | 0.472 | 1.6355 | 23.911 |
| 11* | −2.227 | 0.025 | | |
| 12* | 2.562 | 0.393 | 1.5438 | 55.570 |
| 13* | 5.661 | 0.500 | | |
| 14* | −4.423 | 0.301 | 1.5438 | 55.570 |
| 15* | 4.284 | 0.060 | | |
| 16 | Infinity | 0.300 | 1.5168 | 64.198 |
| 17 | Infinity | 0.610 | | |
| Image Plane | Infinity | | | |

Constituent Lens Data

| Lens | Start Surface | Focal Length |
|---|---|---|
| 1 | 1 | 19.597 |
| 2 | 4 | 3.214 |
| 3 | 6 | −3.676 |
| 4 | 8 | 7.756 |
| 5 | 10 | −184.069 |
| 6 | 12 | 8.241 |
| 7 | 14 | −3.953 |

Composite Focal Length

| f12 | 2.984 |
|---|---|

Aspheric Surface Data

| | 1st Surface | 2nd Surface | 4th Surface | 5th Surface | 6th Surface |
|---|---|---|---|---|---|
| k | 0.000E+00 | 0.000E+00 | 0.000E+00 | 0.000E+00 | −2.399E+01 |
| A4 | −2.588E−02 | −3.045E−02 | 1.627E−02 | 8.497E−02 | −7.432E−02 |
| A6 | −1.344E−02 | −1.724E−02 | −3.376E−03 | −3.529E−02 | 5.948E−03 |
| A8 | 3.083E−03 | −1.075E−03 | 6.697E−03 | 4.166E−03 | 8.369E−03 |
| A10 | −7.891E−03 | 3.276E−04 | −3.162E−04 | 5.606E−03 | −2.317E−04 |
| A12 | 3.747E−03 | 2.744E−04 | −3.939E−04 | −2.260E−03 | −5.540E−04 |
| A14 | −5.404E−04 | 7.486E−05 | 4.678E−05 | 2.208E−04 | −7.923E−06 |
| A16 | −7.675E−06 | −5.309E−05 | 3.204E−05 | −5.373E−06 | −9.315E−09 |

| | 7th Surface | 8th Surface | 9th Surface | 10th Surface | 11th Surface |
|---|---|---|---|---|---|
| k | −4.941E+00 | 0.000E+00 | 0.000E+00 | 0.000E+00 | −1.532E+00 |
| A4 | 4.462E−03 | 1.333E−01 | 1.166E−01 | 1.762E−01 | 2.971E−02 |
| A6 | −2.683E−02 | −2.718E−02 | 8.934E−03 | −1.184E−01 | −2.115E−02 |
| A8 | 2.167E−02 | −2.275E−02 | −2.356E−02 | 4.596E−02 | −2.925E−04 |
| A10 | 3.019E−03 | 4.214E−03 | 6.432E−03 | −5.690E−03 | 3.660E−03 |
| A12 | −8.594E−03 | 7.364E−03 | 8.451E−05 | −1.236E−03 | −2.149E−04 |
| A14 | 4.813E−03 | −3.030E−03 | −3.635E−03 | 1.522E−04 | 2.478E−05 |
| A16 | −7.587E−09 | 0.000E+00 | 0.000E+00 | 5.674E−09 | −1.107E−04 |

| | 12th Surface | 13th Surface | 14th Surface | 15th Surface |
|---|---|---|---|---|
| k | −1.419E+01 | 0.000E+00 | 2.050E+00 | −2.517E+01 |
| A4 | −1.160E−02 | 6.647E−03 | −4.529E−02 | −5.781E−02 |
| A6 | −3.634E−02 | −4.470E−02 | 1.102E−02 | 1.019E−02 |
| A8 | 7.211E−03 | 1.442E−02 | 7.039E−04 | −6.975E−04 |
| A10 | 3.787E−04 | −2.277E−03 | −8.623E−05 | 1.016E−05 |
| A12 | −5.306E−05 | 1.607E−04 | −2.641E−05 | −3.909E−06 |
| A14 | −2.594E−05 | 1.246E−06 | 2.578E−07 | −1.033E−06 |
| A16 | −5.533E−06 | 6.751E−07 | 4.090E−07 | 1.969E−07 |

As shown in Table 6, the imaging lens according to Example 2 satisfies all the conditional expressions (1) to (7).

Figure 4:
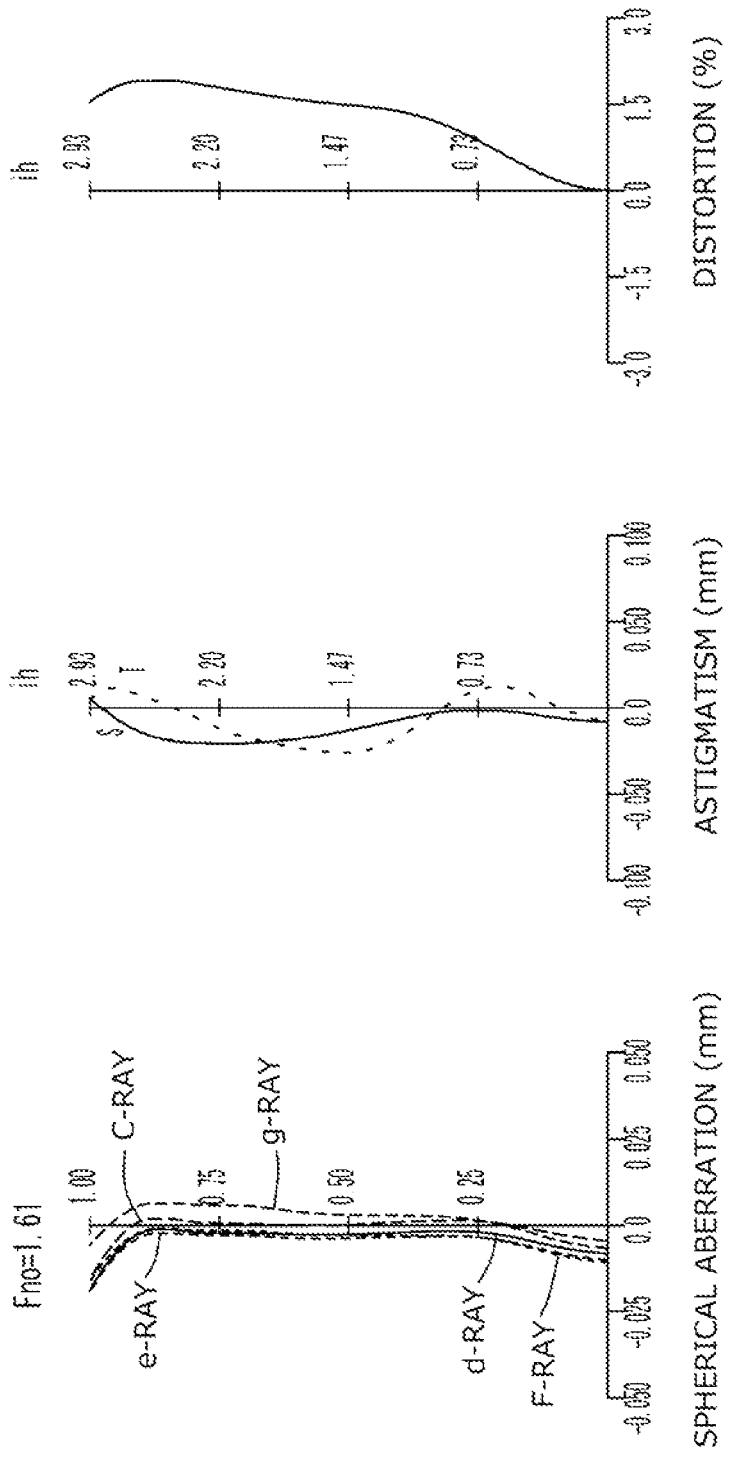
FIG. 4 shows spherical aberration, astigmatism, and distortion of the imaging lens according to Example 2.
Figure 5:
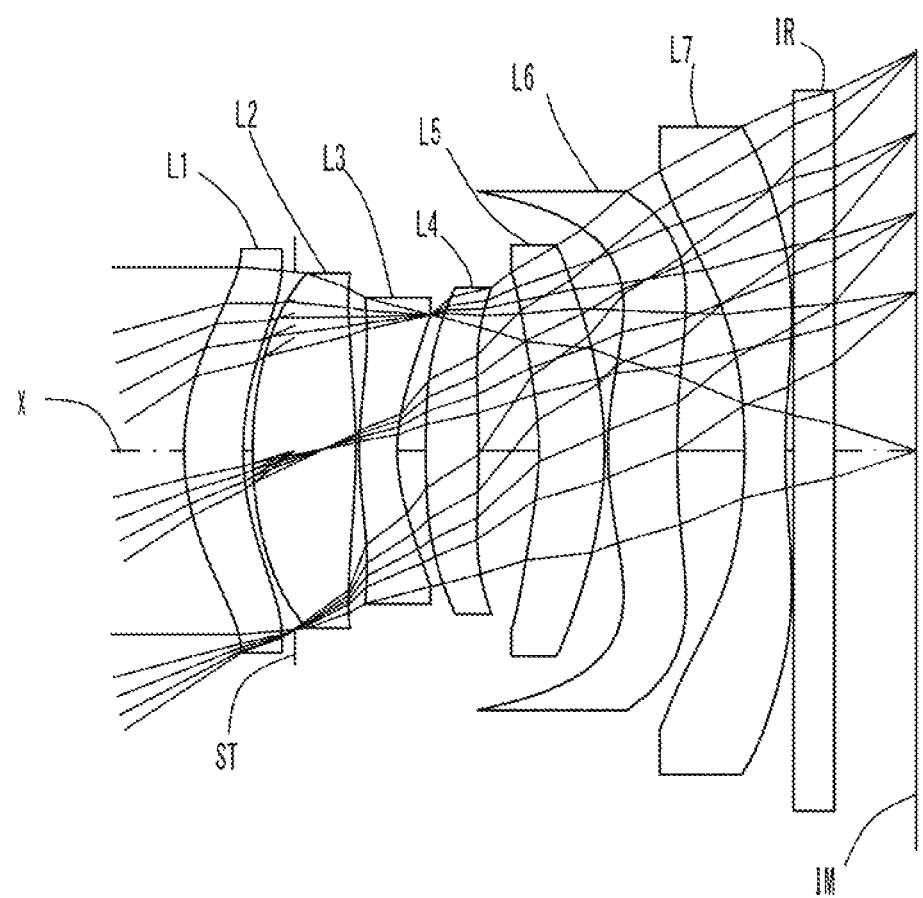
FIG. 5 is a schematic view showing the general configuration of an imaging lens according to Example 3 of the invention.

FIG. 4 shows spherical aberration, astigmatism, and distortion of the imaging lens according to Example 2. As FIG. 4 suggests, various aberrations are properly corrected.

Example 3

The basic lens data of Example 3 is shown below in Table 3.

TABLE 3

Numerical Example 3
in mm f = 4.35
Fno = 1.61
ω (deg) = 33.5
ih = 2.93
TTL = 5.29

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 1.811 | 0.435 | 1.5346 | 56.160 |
| 2* | 2.061 | 0.379 | | |
| 3 (Stop) | Infinity | −0.310 | | |
| 4* | 2.972 | 0.757 | 1.5346 | 56.160 |
| 5* | −4.842 | 0.026 | | |
| 6* | 2.739 | 0.280 | 1.6355 | 23.911 |
| 7* | 1.327 | 0.210 | | |
| 8* | 10.737 | 0.392 | 1.5346 | 56.160 |
| 9* | −6.667 | 0.443 | | |
| 10* | −2.288 | 0.483 | 1.6355 | 23.911 |
| 11* | −2.741 | 0.025 | | |
| 12* | 2.522 | 0.509 | 1.5438 | 55.570 |
| 13* | 6.671 | 0.495 | | |
| 14* | −4.708 | 0.300 | 1.5438 | 55.570 |
| 15* | 4.458 | 0.060 | | |
| 16 | Infinity | 0.300 | 1.5168 | 64.198 |
| 17 | Infinity | 0.611 | | |
| Image Plane | Infinity | | | |

Constituent Lens Data

| Lens | Start Surface | Focal Length |
|---|---|---|
| 1 | 1 | 17.392 |
| 2 | 4 | 3.565 |
| 3 | 6 | −4.391 |
| 4 | 8 | 7.755 |
| 5 | 10 | −37.202 |
| 6 | 12 | 7.147 |
| 7 | 14 | −4.163 |

Composite Focal Length

| f12 | 3.223 |
|---|---|

Aspheric Surface Data

| | 1st Surface | 2nd Surface | 4th Surface | 5th Surface | 6th Surface |
|---|---|---|---|---|---|
| k | 0.000E+00 | 0.000E+00 | 0.000E+00 | 0.000E+00 | −2.079E+01 |
| A4 | −2.541E−02 | −3.036E−02 | 1.723E−02 | 8.057E−02 | −7.974E−02 |
| A6 | −1.294E−02 | −1.835E−02 | −7.877E−04 | −3.527E−02 | 8.318E−04 |
| A8 | 2.519E−03 | −1.075E−03 | 6.396E−03 | 4.455E−03 | 6.390E−03 |
| A10 | −8.191E−03 | 1.662E−04 | −1.598E−04 | 5.365E−03 | 3.628E−04 |
| A12 | 3.676E−03 | 1.087E−04 | −1.465E−04 | −2.077E−03 | 2.432E−04 |
| A14 | −5.541E−04 | 1.381E−05 | 5.068E−05 | 3.349E−04 | −1.814E−10 |
| A16 | −1.560E−05 | −4.163E−05 | 1.269E−06 | 9.495E−11 | −8.206E−11 |

| | 7th Surface | 8th Surface | 9th Surface | 10th Surface | 11th Surface |
|---|---|---|---|---|---|
| k | −5.518E+00 | 0.000E+00 | 0.000E+00 | 0.000E+00 | −2.430E+00 |
| A4 | −3.273E−03 | 1.333E−01 | 1.166E−01 | 1.782E−01 | 2.990E−02 |
| A6 | −3.079E−02 | −2.718E−02 | 8.934E−03 | −1.101E−01 | −2.219E−02 |
| A8 | 1.859E−02 | −2.275E−02 | −2.356E−02 | 3.986E−02 | 1.953E−03 |
| A10 | 3.980E−03 | 4.214E−03 | 6.432E−03 | −4.996E−03 | 3.378E−03 |
| A12 | −8.549E−03 | 7.364E−03 | 8.451E−05 | −1.086E−03 | −6.961E−04 |
| A14 | 4.813E−03 | −3.030E−03 | −3.635E−04 | −7.581E−11 | −2.481E−05 |
| A16 | 5.236E−12 | 0.000E+00 | 0.000E+00 | 6.501E−12 | −4.169E−05 |

TABLE 3-continued

Numerical Example 3
in mm

| | 12th Surface | 13th Surface | 14th Surface | 15th Surface |
|---|---|---|---|---|
| k | −1.042E+01 | 0.000E+00 | 2.886E+00 | −2.941E+01 |
| A4 | −1.359E−02 | 2.248E−02 | −4.729E−02 | −4.789E−02 |
| A6 | −3.048E−02 | −4.633E−02 | 1.124E−02 | 7.971E−03 |
| A8 | 4.457E−03 | 1.394E−02 | 6.397E−04 | −6.186E−04 |
| A10 | −2.316E−05 | −2.365E−03 | −8.194E−05 | 4.033E−05 |
| A12 | −8.171E−05 | 1.547E−04 | −2.782E−05 | −3.314E−07 |
| A14 | −2.648E−05 | −6.468E−07 | −4.383E−08 | −1.067E−06 |
| A16 | −1.689E−06 | 1.539E−07 | 3.462E−07 | 6.428E−08 |

As shown in Table 6, the imaging lens according to Example 3 satisfies all the conditional expressions (1) to (7).

Figure 6:
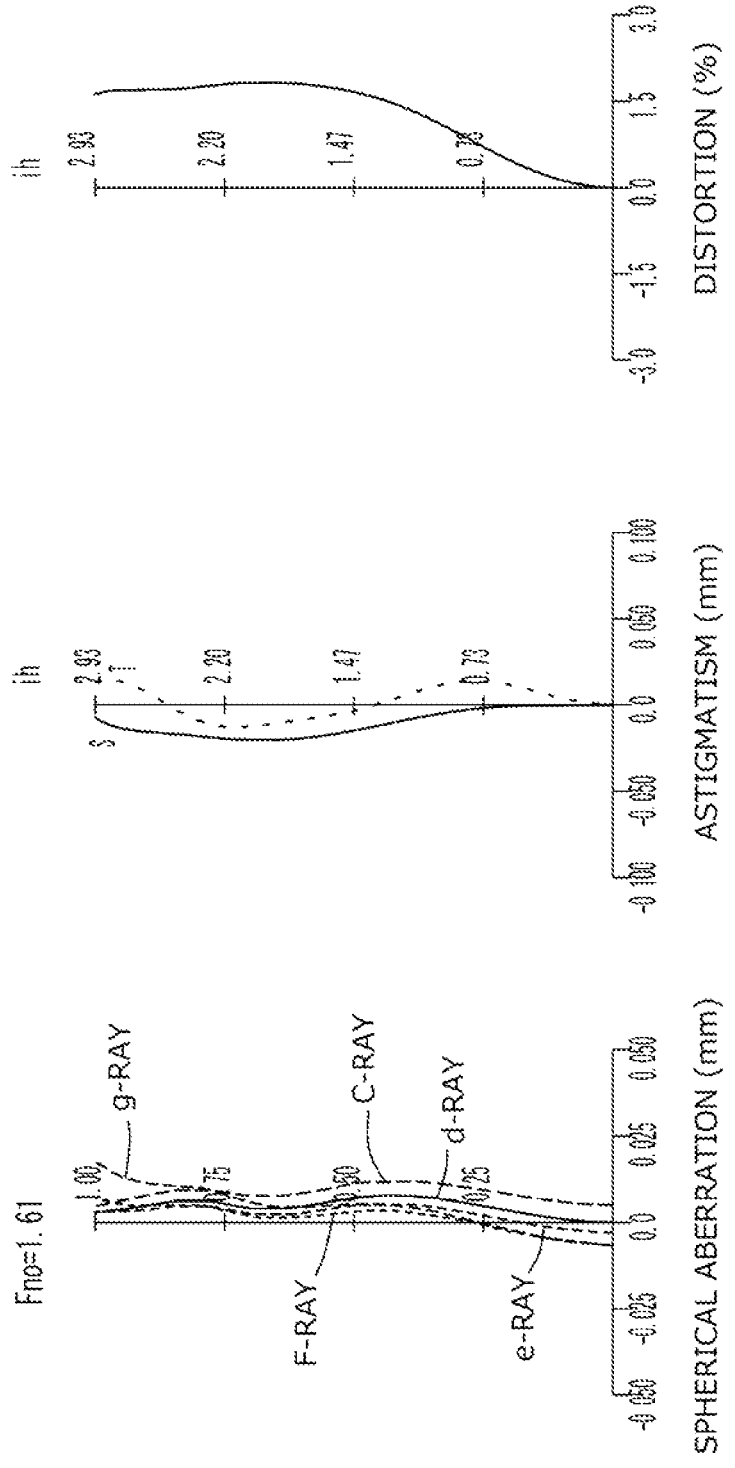
FIG. 6 shows spherical aberration, astigmatism, and distortion of the imaging lens according to Example 3.
Figure 7:
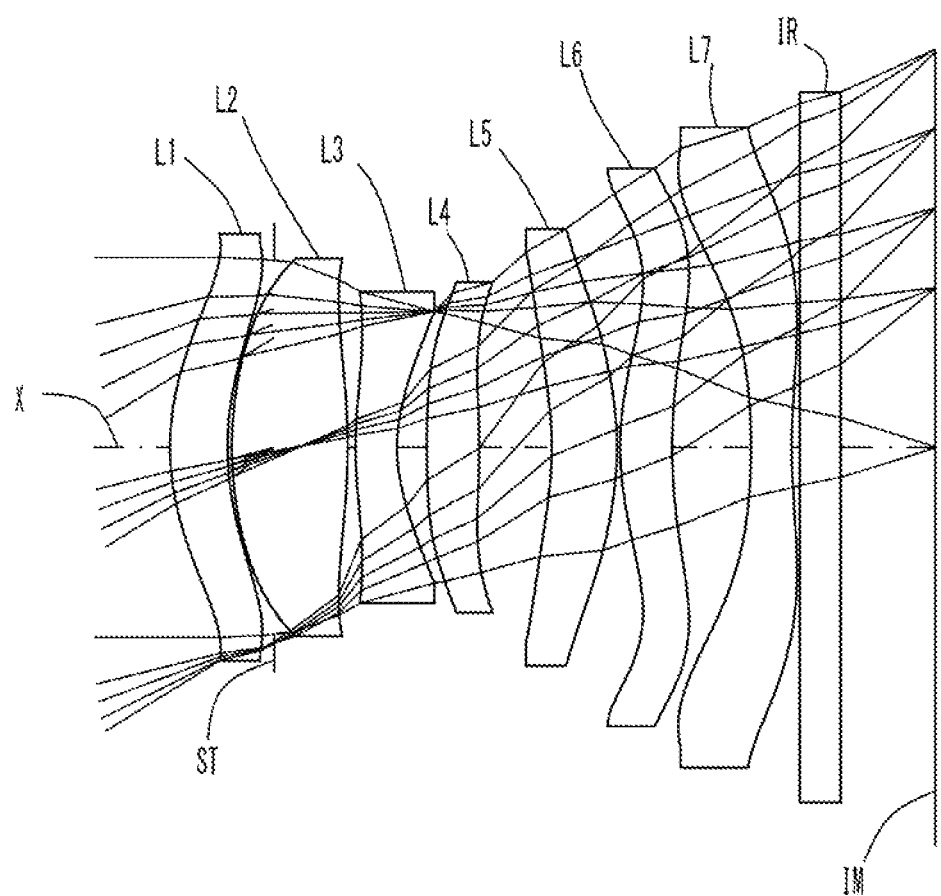
FIG. 7 is a schematic view showing the general configuration of an imaging lens according to Example 4 of the invention.

FIG. 6 shows spherical aberration, astigmatism, and distortion of the imaging lens according to Example 3. As FIG. 6 suggests, various aberrations are properly corrected.

Example 4

The basic lens data of Example 4 is shown below in Table 4.

TABLE 4

Numerical Example 4
in mm f = 4.67
Fno = 1.61
ω (deg) = 31.7
ih = 2.93
TTL = 5.53

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 1.947 | 0.423 | 1.5346 | 56.160 |
| 2* | 2.195 | 0.342 | | |
| 3 (Stop) | Infinity | −0.310 | | |
| 4* | 2.907 | 0.852 | 1.5346 | 56.160 |
| 5* | −4.062 | 0.056 | | |
| 6* | 2.986 | 0.305 | 1.6355 | 23.911 |
| 7* | 1.210 | 0.220 | | |
| 8* | 10.737 | 0.389 | 1.5346 | 56.160 |
| 9* | −6.667 | 0.535 | | |
| 10* | −2.463 | 0.478 | 1.6355 | 23.911 |
| 11* | −2.600 | 0.025 | | |
| 12* | 2.236 | 0.382 | 1.5438 | 55.570 |
| 13* | 4.264 | 0.580 | | |
| 14* | −4.975 | 0.300 | 1.5438 | 55.570 |
| 15* | 4.893 | 0.060 | | |
| 16 | Infinity | 0.300 | 1.5168 | 64.198 |
| 17 | Infinity | 0.703 | | |
| Image Plane | Infinity | | | |

Constituent Lens Data

| Lens | Start Surface | Focal Length |
|---|---|---|
| 1 | 1 | 20.244 |
| 2 | 4 | 3.311 |
| 3 | 6 | −3.432 |
| 4 | 8 | 7.754 |
| 5 | 10 | 210.517 |
| 6 | 12 | 8.111 |
| 7 | 14 | −4.488 |

Composite Focal Length

| f12 | 3.081 |

TABLE 4-continued

Numerical Example 4
in mm

Aspheric Surface Data

|     | 1st Surface | 2nd Surface | 4th Surface | 5th Surface | 6th Surface |
|-----|-------------|-------------|-------------|-------------|-------------|
| k   | 0.000E+00   | 0.000E+00   | 0.000E+00   | 0.000E+00   | −3.171E+01  |
| A4  | −2.514E−02  | −2.981E−02  | 1.517E−02   | 8.718E−02   | −7.635E−02  |
| A6  | −1.267E−02  | −1.795E−02  | −1.896E−03  | −3.512E−02  | 5.147E−03   |
| A8  | 2.965E−03   | −1.062E−03  | 6.378E−03   | 4.702E−03   | 8.248E−03   |
| A10 | −7.975E−03  | 2.531E−04   | −3.606E−04  | 5.885E−03   | 1.080E−04   |
| A12 | 3.739E−03   | 1.878E−04   | −3.374E−04  | −1.900E−03  | −6.483E−04  |
| A14 | −5.366E−04  | 4.815E−05   | 1.398E−05   | 6.850E−05   | 7.455E−09   |
| A16 | −1.151E−05  | −3.502E−05  | 5.232E−05   | −1.702E−10  | 3.540E−09   |

|     | 7th Surface | 8th Surface | 9th Surface | 10th Surface | 11th Surface |
|-----|-------------|-------------|-------------|--------------|--------------|
| k   | −5.117E+00  | 0.000E+00   | 0.000E+00   | 0.000E+00    | −1.779E+00   |
| A4  | 5.084E−03   | 1.333E−01   | 1.166E−01   | 1.648E−01    | 3.002E−02    |
| A6  | −2.680E−02  | −2.718E−02  | 8.934E−03   | −1.034E−01   | −1.928E−02   |
| A8  | 1.936E−02   | −2.275E−02  | −2.356E−02  | 4.037E−02    | 1.610E−03    |
| A10 | 2.465E−03   | 4.214E−03   | 6.432E−03   | −6.220E−03   | 3.245E−03    |
| A12 | −8.552E−03  | 7.364E−03   | 8.451E−05   | −6.714E−04   | −6.733E−04   |
| A14 | 4.810E−03   | −3.030E−03  | −3.635E−04  | 2.031E−04    | 7.039E−06    |
| A16 | −7.751E−15  | 0.000E+00   | 0.000E+00   | −2.461E−08   | −2.005E−05   |

|     | 12th Surface | 13th Surface | 14th Surface | 15th Surface |
|-----|--------------|--------------|--------------|--------------|
| k   | −7.605E+00   | 0.000E+00    | 2.911E+00    | −4.208E+01   |
| A4  | −3.902E−03   | 1.529E−02    | −5.099E−02   | −4.642E−02   |
| A6  | −2.818E−02   | −4.334E−02   | 1.168E−02    | 6.574E−03    |
| A8  | 5.029E−03    | 1.402E−02    | 7.135E−04    | −5.918E−04   |
| A10 | 4.479E−05    | −2.336E−03   | −6.781E−05   | 5.885E−05    |
| A12 | −1.233E−05   | 1.720E−04    | −2.534E−05   | 3.887E−07    |
| A14 | −2.613E−06   | 1.772E−06    | 2.218E−07    | −8.690E−07   |
| A16 | 4.552E−07    | −1.893E−08   | 3.522E−07    | 1.116E−07    |

As shown in Table 6, the imaging lens according to Example 4 satisfies all the conditional expressions (1) to (7).

Figure 8:
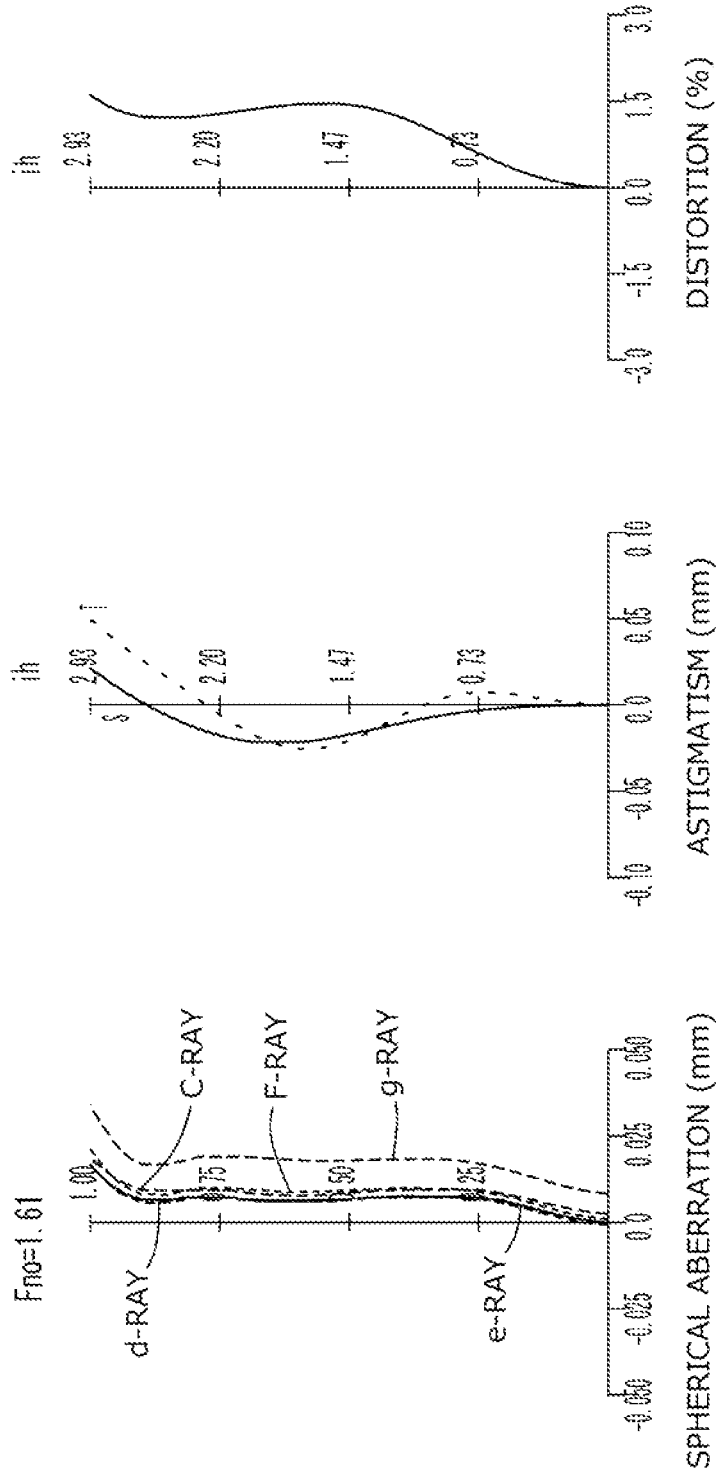
FIG. 8 shows spherical aberration, astigmatism, and distortion of the imaging lens according to Example 4.
Figure 9:
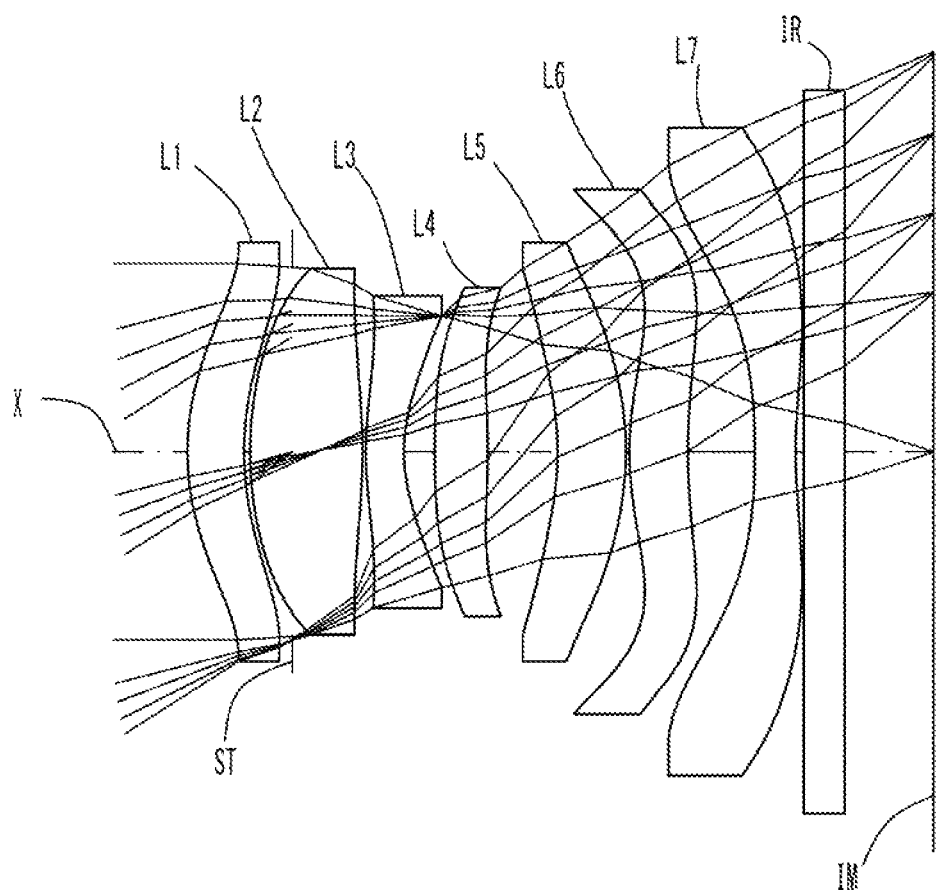
FIG. 9 is a schematic view showing the general configuration of an imaging lens according to Example 5 of the invention.

FIG. 8 shows spherical aberration, astigmatism, and distortion of the imaging lens according to Example 4. As FIG. 8 suggests, various aberrations are properly corrected.

Example 5

The basic lens data of Example 5 is shown below in Table 5.

TABLE 5

Numerical Example 5
in mm f = 4.52
Fno = 1.61
ω (deg) = 32.5
ih = 2.93
TTL = 5.39

Surface Data

| Surface No. i | Curvature Radius r | Surface Distance d | Refractive Index Nd | Abbe Number vd |
|---------------|--------------------|--------------------|---------------------|----------------|
| (Object Surface) | Infinity | Infinity | | |
| 1* | 1.932 | 0.416 | 1.5346 | 56.160 |
| 2* | 2.205 | 0.356 | | |
| 3(Stop) | Infinity | −0.310 | | |
| 4* | 2.830 | 0.825 | 1.5438 | 55.570 |
| 5* | −4.537 | 0.025 | | |
| 6* | 2.674 | 0.281 | 1.6355 | 23.911 |
| 7* | 1.225 | 0.227 | | |
| 8* | 10.737 | 0.391 | 1.5438 | 55.570 |
| 9* | −6.667 | 0.516 | | |
| 10* | −2.020 | 0.502 | 1.6142 | 25.577 |
| 11* | −2.331 | 0.027 | | |
| 12* | 2.411 | 0.431 | 1.5438 | 55.570 |
| 13* | 5.386 | 0.492 | | |
| 14* | −5.074 | 0.300 | 1.5438 | 55.570 |
| 15* | 4.201 | 0.060 | | |
| 16 | Infinity | 0.300 | 1.5168 | 64.198 |

TABLE 5-continued

Numerical Example 5
in mm

| | | |
|---|---|---|
| 17 | Infinity | 0.661 |
| Image Plane | Infinity | |

Constituent Lens Data

| Lens | Start Surface | Focal Length |
|---|---|---|
| 1 | 1 | 19.037 |
| 2 | 4 | 3.337 |
| 3 | 6 | −3.848 |
| 4 | 8 | 7.624 |
| 5 | 10 | −63.587 |
| 6 | 12 | 7.636 |
| 7 | 14 | −4.178 |

Composite Focal Length

| | |
|---|---|
| f12 | 3.071 |

Aspheric Surface Data

| | 1st Surface | 2nd Surface | 4th Surface | 5th Surface | 6th Surface |
|---|---|---|---|---|---|
| k | 0.000E+00 | 0.000E+00 | 0.000E+00 | 0.000E+00 | −2.363E+01 |
| A4 | −2.581E−02 | −3.076E−02 | 1.753E−02 | 8.382E−02 | −7.444E−02 |
| A6 | −1.347E−02 | −1.720E−02 | −3.147E−03 | −3.551E−02 | 5.772E−03 |
| A8 | 3.083E−03 | −1.057E−03 | 6.771E−03 | 3.978E−03 | 7.923E−03 |
| A10 | −7.892E−03 | 3.389E−04 | −3.134E−04 | 5.493E−03 | 2.625E−04 |
| A12 | 3.742E−03 | 2.804E−04 | −4.051E−04 | −2.306E−03 | −8.276E−04 |
| A14 | −5.421E−04 | 7.598E−05 | 4.239E−05 | 2.229E−04 | 2.057E−07 |
| A16 | −7.174E−06 | −5.350E−05 | 3.405E−05 | −1.593E−08 | −1.165E−10 |

| | 7th Surface | 8th Surface | 9th Surface | 10th Surface | 11th Surface |
|---|---|---|---|---|---|
| k | −5.113E+00 | 0.000E+00 | 0.000E+00 | 0.000E+00 | −1.241E+00 |
| A4 | 3.365E−03 | 1.333E−01 | 1.166E−01 | 1.803E−01 | 2.747E−02 |
| A6 | −2.559E−02 | −2.718E−02 | 8.934E−03 | −1.183E−01 | −2.152E−02 |
| A8 | 2.200E−02 | −2.275E−02 | −2.356E−02 | 4.581E−02 | 4.305E−04 |
| A10 | 2.594E−03 | 4.214E−03 | 6.432E−03 | −3.826E−03 | 3.976E−03 |
| A12 | −8.566E−03 | 7.364E−03 | 8.451E−05 | −1.811E−03 | −3.477E−04 |
| A14 | 4.791E−03 | −3.030E−03 | −3.635E−04 | −3.018E−05 | 1.946E−05 |
| A16 | 1.044E−10 | 0.000E+00 | 0.000E+00 | 1.393E−04 | −8.192E−05 |

| | 12th Surface | 13th Surface | 14th Surface | 15th Surface |
|---|---|---|---|---|
| k | −1.134E+01 | 0.000E+00 | 1.286E+00 | −2.974E+01 |
| A4 | −1.147E−02 | 5.069E−03 | −6.218E−02 | −5.562E−02 |
| A6 | −3.964E−02 | −4.732E−02 | 1.439E−02 | 1.107E−02 |
| A8 | 7.440E−03 | 1.442E−02 | −1.796E−04 | −1.025E−03 |
| A10 | 3.038E−04 | −2.197E−03 | 5.922E−07 | 4.355E−05 |
| A12 | −1.288E−04 | 1.423E−04 | −2.141E−05 | −6.258E−06 |
| A14 | −3.962E−07 | −5.039E−07 | 1.447E−06 | −8.289E−07 |
| A16 | 2.395E−06 | 2.550E−06 | 4.262E−08 | 2.121E−07 |

As shown in Table 6, the imaging lens according to Example 5 satisfies all the conditional expressions (1) to (7).

Figure 10:
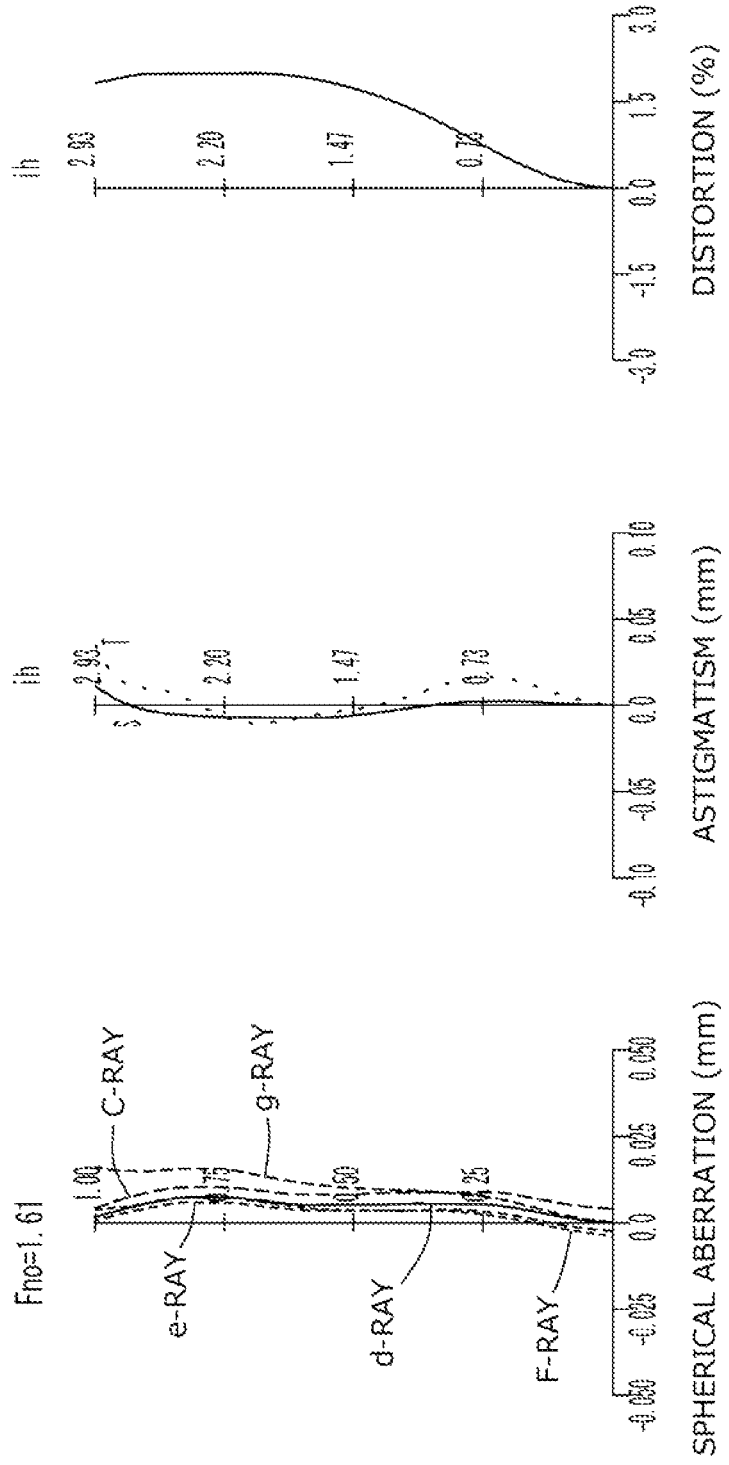
FIG. 10 shows spherical aberration, astigmatism, and distortion of the imaging lens according to Example 5.

FIG. 10 shows spherical aberration, astigmatism, and distortion of the imaging lens according to Example 5. As FIG. 10 suggests, various aberrations are properly corrected.

As mentioned above, the imaging lenses according to Examples 1 to 5 provide brightness with an F-value of about 1.6 and improved performance. Although the seven constituent lenses are not joined to each other, the total track length is as short as about 5.5 mm, which is shorter than the diagonal length of the effective image plane of the image sensor.

Table 6 shows data on Examples 1 to 5 of the embodiment relating to the conditional expressions (1) to (7).

TABLE 6

| Values of Conditional Expressions | Example 1 | Example 2 | Example 3 | Example 4 | Example 5 |
|---|---|---|---|---|---|
| (1) 50 < vd1 < 60 | 56.160 | 56.1603 | 56.1603 | 56.1603 | 56.1603 |
| (2) 50 < vd2 < 60 | 56.160 | 56.1603 | 56.1603 | 56.1603 | 55.5699 |
| (3) 20 < vd3 < 30 | 23.911 | 23.9114 | 23.9114 | 23.9114 | 23.9114 |
| (4) 50 < vd4 < 60 | 56.160 | 56.160 | 56.160 | 56.160 | 55.570 |
| (5) 20 < vd5 < 30 | 23.911 | 23.911 | 23.911 | 23.911 | 25.577 |

TABLE 6-continued

| Values of Conditional Expressions | Example 1 | Example 2 | Example 3 | Example 4 | Example 5 |
|---|---|---|---|---|---|
| (6) 0.55 < f12/f < 0.88 | 0.690 | 0.654 | 0.741 | 0.660 | 0.680 |
| (7) −1.2 < f3/f < −0.7 | −0.866 | −0.805 | −1.010 | −0.735 | −0.852 |

As explained above, when the imaging lens according to any of the aforementioned examples is used for an optical system built in an image pickup device mounted in an increasingly compact and low-profile mobile terminal such as a smart phone, mobile phone or PDA (Personal Digital Assistant), or a game console or information terminal such as a PC, it provides a compact high-performance camera function.

The effects of the present invention are as follows. According to the present invention, it is possible to provide a compact imaging lens which corrects various aberrations properly with a small F-value. Also, when plastic material is used for the constituent lenses as much as possible, the imaging lens can be mass-produced at low cost.

What is claimed is:

1. A fixed-focus imaging lens composed of seven lenses to form an image of an object on a solid-state image sensor, in which the lenses are arranged in order from an object side to an image side, comprising:
   a first lens having a convex surface on the object side near an optical axis;
   a second lens with positive refractive power;
   a third lens with negative refractive power having a convex surface on the object side near the optical axis;
   a fourth lens having at least one aspheric surface;
   a fifth lens as a double-sided aspheric lens;
   a sixth lens as a double-sided aspheric lens; and
   a seventh lens as a double-sided aspheric lens having a concave surface on the image side near the optical axis,
   wherein the lenses are not joined to each other.

2. The imaging lens according to claim 1, wherein the first lens has a meniscus shape near the optical axis and both surfaces thereof have aspheric shapes with peripheral portions thereof curved toward the object side, and the third lens has a meniscus shape near the optical axis.

3. The imaging lens according to claim 1, wherein the fourth lens has a biconvex shape near the optical axis, and the image-side surface thereof has an aspheric shape with a concave surface in a peripheral portion thereof.

4. The imaging lens according to claim 1, wherein the fifth lens has a meniscus shape with a concave surface on the object side near the optical axis.

5. The imaging lens according to claim 1, wherein the sixth lens has a meniscus shape with a convex surface on the object side near the optical axis, and the aspheric object-side and image-side surfaces thereof each have a pole-change point.

6. The imaging lens according to claim 1, wherein the seventh lens has negative refractive power, and the image-side surface thereof has an aspheric shape with a pole-change point.

7. The imaging lens according to claim 1, wherein conditional expressions (1), (2), and (3) below are satisfied:

$$50 < vd1 < 60 \quad (1)$$

$$50 < vd2 < 60 \quad (2)$$

$$20 < vd3 < 30 \quad (3)$$

where
vd1: Abbe number of the first lens at d-ray,
vd2: Abbe number of the second lens at d-ray, and
vd3: Abbe number of the third lens at d-ray.

8. The imaging lens according to claim 1, wherein conditional expressions (4) and (5) below are satisfied:

$$50 < vd4 < 60 \quad (4)$$

$$20 < vd5 < 30 \quad (5)$$

where
vd4: Abbe number of the fourth lens at d-ray, and
vd5: Abbe number of the fifth lens at d-ray.

9. The imaging lens according to claim 1, wherein conditional expressions (6) and (7) below are satisfied:

$$0.55 < f12/f < 0.88 \quad (6)$$

$$-1.2 < f3/f < -0.7 \quad (7)$$

where
f: focal length of the overall optical system of the imaging lens,
f12: composite focal length of the first lens and the second lens, and
f3: focal length of the third lens.

10. A fixed-focus imaging lens composed of seven lenses to form an image of an object on a solid-state image sensor, in which the lenses are arranged in order from an object side to an image side, comprising:
    a first lens as a double-sided aspheric lens having a convex surface on the object side near an optical axis;
    a second lens with positive refractive power having a convex surface on the object side near the optical axis;
    a third lens as a double-sided aspheric lens;
    a fourth lens as a double-sided aspheric lens;
    a fifth lens as a double-sided aspheric lens;
    a sixth lens as a double-sided aspheric lens having a meniscus shape with a convex surface on the object side near the optical axis; and
    a seventh lens as a double-sided aspheric lens with negative refractive power having a concave surface on the image side near the optical axis,
    wherein the lenses are not joined to each other.

11. The imaging lens according to claim 10, wherein the third lens has negative refractive power with a concave surface on the image side near the optical axis.

12. The imaging lens according to claim 10, wherein the fourth lens has a biconvex shape near the optical axis, and the image-side surface thereof has an aspheric shape with a concave surface in a peripheral portion thereof.

13. The imaging lens according to claim 10, wherein the aspheric object-side and image-side surfaces of the sixth lens each have a pole-change point.

14. The imaging lens according to claim 10, wherein the image-side surface of the seventh lens is an aspheric surface with a pole-change point.

15. The imaging lens according to claim 10, wherein the first lens has a meniscus shape near the optical axis, and both surfaces thereof have aspheric shapes with peripheral portions thereof curved toward the object side.

16. The imaging lens according to claim 10, wherein conditional expressions (1), (2), and (3) below are satisfied:

$$50 < vd1 < 60 \quad (1)$$

$$50 < vd2 < 60 \quad (2)$$

$$20 < vd3 < 30 \quad (3)$$

where
vd1: Abbe number of the first lens at d-ray,
vd2: Abbe number of the second lens at d-ray, and
vd3: Abbe number of the third lens at d-ray.

17. The imaging lens according to claim 10, wherein conditional expressions (4) and (5) below are satisfied:

$$50 < vd4 < 60 \quad (4)$$

$$20 < vd5 < 30 \quad (5)$$

where
vd4: Abbe number of the fourth lens at d-ray, and
vd5: Abbe number of the fifth lens at d-ray.

18. The imaging lens according to claim 10, wherein conditional expressions (6) and (7) below are satisfied:

$$0.55 < f12/f < 0.88 \quad (6)$$

$$-1.2 < f3/f < -0.7 \quad (7)$$

where
f: focal length of the overall optical system of the imaging lens,
f12: composite focal length of the first lens and the second lens, and
f3: focal length of the third lens.

* * * * *